March 7, 1944.  A. HOROWITZ ET AL  2,343,553
HAIR-CUTTING DEVICE
Filed May 31, 1939     2 Sheets-Sheet 1
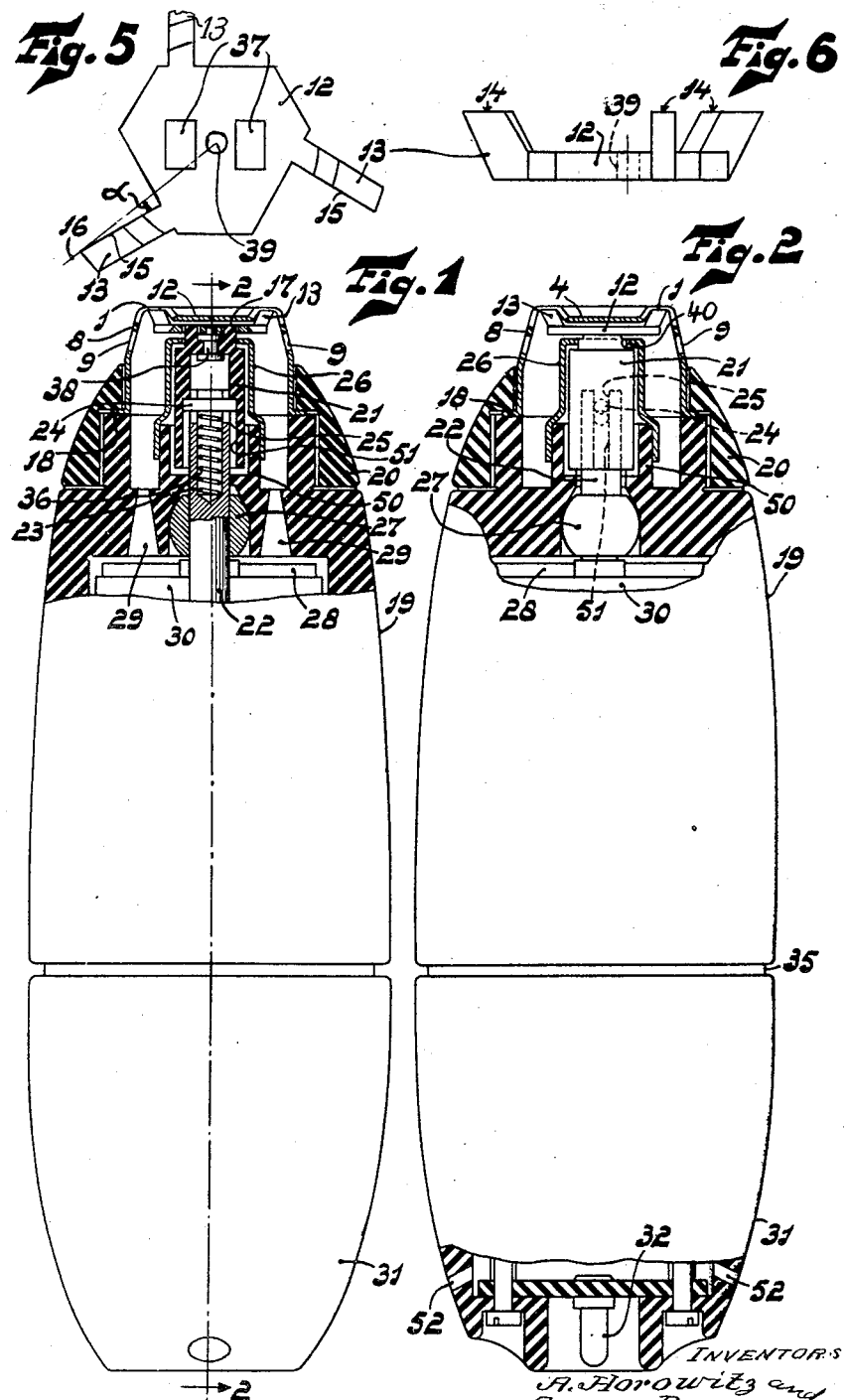

March 7, 1944.  A. HOROWITZ ET AL  2,343,553
HAIR-CUTTING DEVICE
Filed May 31, 1939  2 Sheets-Sheet 2

INVENTORS
A. Horowitz and
A. van Dam
By
E. F. Wendroth
ATTORNEY

Patented Mar. 7, 1944

2,343,553

UNITED STATES PATENT OFFICE 2,343,553

HAIRCUTTING DEVICE

Alexandre Horowitz and Alexis van Dam, Eindhoven, Netherlands, assignors, by mesne assignments, to Hartford National Bank and Trust Company, Hartford, Conn., as trustee Application May 31, 1939, Serial No. 276,746 In Germany June 13, 1938

3 Claims. (Cl. 30—43)

Our invention relates to hair-cutting devices and more particularly to electrically-driven razors of the type which comprise a cutting head having an apertured cutting or shear plate and a rotatable cutter. Such razors are generally used for so-called dry-shaving in which neither water nor soap is used.

The main object of our invention is to improve the construction and operation of such devices.

A further object is to provide an improved type of shear plate.

A still further object is to provide a hair-cutting device by which the hairs can be cut very close to the skin.

Another object is to provide a cutting-device which will operate satisfactorily when the cutting head is moved in any direction over the surface from which the hairs are to be removed.

Further objects of the invention will appear as the description progresses.

In accordance with the invention, we use a cutting or shear plate which is provided with a central cavity and with a plurality of narrow slits which extend substantially radially and through the wall of the cavity. The cutter has a supporting portion and a plurality of arms having cutting edges which are rotated over the inner surface of the slitted surface of the shear plate.

The cutting edges of the cutter preferably form an acute angle with the cutting edges of the shear plate in order that the hairs will be cut by a scissor-like action and that the edges will not collide. Furthermore, we prefer to use a cutter having three cutting edges which are equally spaced apart in order that there will be an equal distribution of the cutting pressure on all the cutting edges and each cutting edge will have the same cutting effect.

In order to increase the catching capacity of the shear plate the slits may extend through the outer wall of the cutting head.

To ensure that the hairs will be directed into the slits during movement of the cutting head over the skin, we prefer to widen the ends of the slits extending through said outer wall of the shear plate. For this purpose the inner ends of the slits at the wall of the central cavity may also be widened.

In order that the invention may be clearly understood and readily carried into effect we shall describe the same in more detail with reference to the accompanying drawings in which, Figure 1 is a partly-sectionized side view of an electric razor according to the invention.

Fig. 2 is a partly-sectionized view along line 2—2 of Figure 1,

Fig. 5 is a top view on an enlarged scale of the cutter of Figures 1 and 2, and

Fig. 6 is a side view of the cutter of Figure 5.

Figure 4:
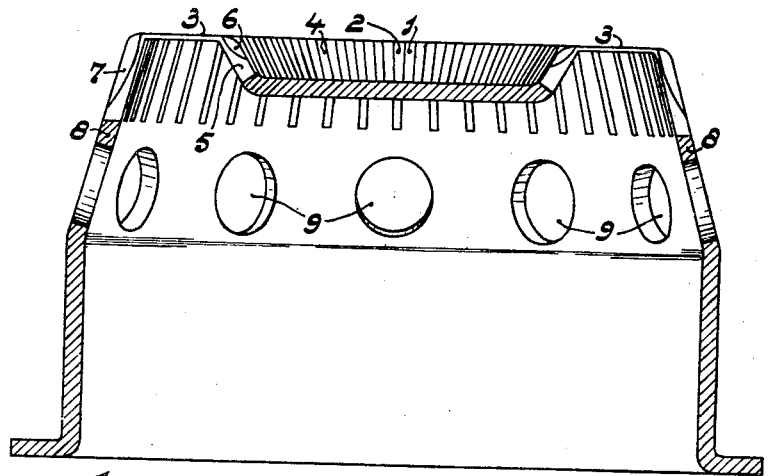
Fig. 4 is a sectional view along line 4—4 of Figure 3.

The electric razor illustrated in Figures 1 and 2 has a housing comprising two hollow members 19 and 31 of insulating material such as "Bakelite" which are screwed together at 35. Within housing 31 is an electric driving motor 30 having a shaft 22. As shown in Figure 2 the member 31 is provided with a socket having two plugs 32 (only one being shown) which are connected to the motor and are adapted to be connected to a suitable voltage supply. A shear plate 1 (later to be described) has a flange 18 secured between an annular projection of member 19 and a collar 20 which is screwed to the projection.

Cooperating with shear plate 1 is a rotary cutter 12 (later to be described) driven from the shaft 22. Shaft 22 is journalled in a ball 27 bearing upon the wall of a cavity in member 19, and is provided on its end with a cavity 36 and a slot 25. A compression spring 23 arranged within cavity 36 bears upon a pin 24 which is guided in slot 25. Pin 24 engages a slot 51 in a member 21 of insulated material which is provided on its upper end with two driving projections 17 engaging rectangular holes 37 with clearance in the cutter 12. A metal pin 38 is secured to the top of member 21 and has a projecting portion passing through a central hole 39 in cutter 12 and a shoulder engaging the lower surface of the cutter 12. Thus, the spring 23 presses the cutting edges of cutter 12 against the inner surface of shear plate 1 and as the cutter is centrally supported on the shoulder of pin 38 it adjusts itself to the proper position.

To hold member 21 in place when the razor is disassembled, a metal member 26 secured to a central annular extension 50 of portion 19, for instance by a force fit, is adapted to engage a shoulder 40 on member 21. It will be noted that the outer surface of the razor in the vicinity of the cutting head is smooth so that there will be no injury to the face when shaving.

A fan 28 is mounted on the shaft 22 and serves to ventilate the motor, and passageways 52 and 29 are provided in members 31 and 19 so that the air will pass through the cutting head and remove any hairs which may be introduced therein during the cutting.

Figure 3:
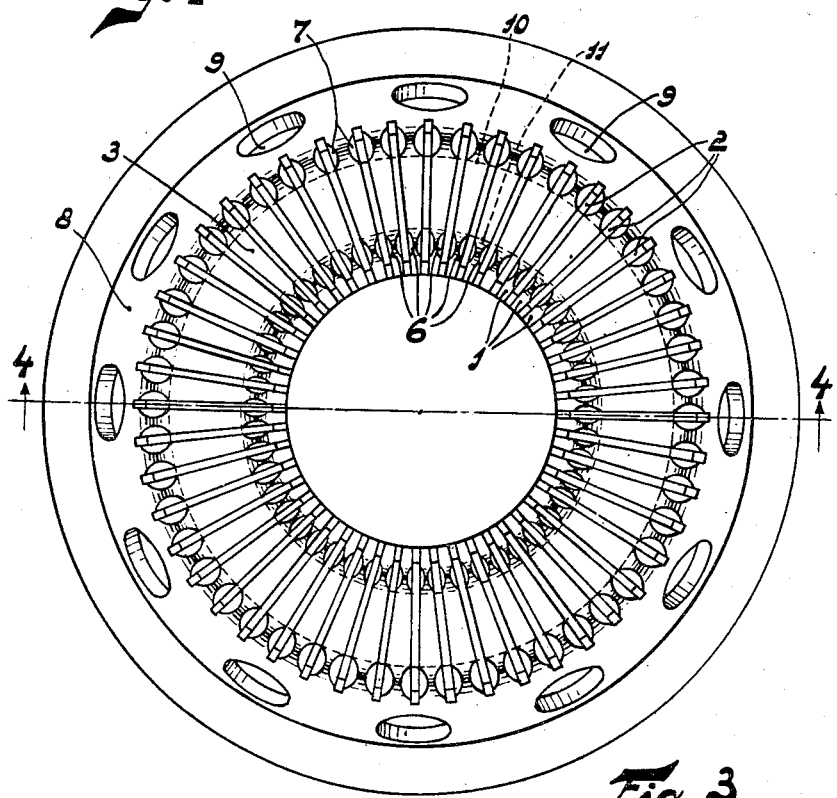
Fig. 3 is a top view on an enlarged scale of the shear plate of Figs. 1 and 2.

As shown in more detail in Figures 3 and 4 the shear plate 1 is of cut-shape and is provided with a central cavity 4 to form an annular active portion 3. Portion 3 is provided with a large number of substantially radially-extending slits 2. Slits 2 preferably have a width of about 0.2 mm. so that, in known manner, only the hair to be cut and not the skin will penetrate therethrough and be cut by the cutter.

The slits 2 extend through the wall 5 of the cavity and are widened at their inner ends, indicated by reference numerals 6 so that the hairs within wall 5 of the cavity will be readily introduced into the slits upon movement of the razor over the skin. For the same purpose, the outer ends of the slits extending through the outer wall 8 of the shearing plate, are widened at 7. The outer wall 8 of the shear plate 1 is provided with several holes 9 through which the hairs cut during operation may be blown by the air produced by fan 28 (see Fig. 1).

A shear plate such as shown in Figs. 3 and 4 can be manufactured very cheaply for instance by being drawn from a single piece of sheet metal.

The radial arrangement of the slits 2 has the advantage that the slits extend in all directions, so that by moving the cutting head over the skin, at least one slit will always extend in the direction of movement and thus even oblique hairs will be caught in the slits. Particularly good results are obtained if the cutting head is moved in circles over the skin. Furthermore, due to the pressure with which the cutting plate is pressed to the skin during the shaving, the skin will be bellied in a substantially spherical manner within cavity 4 with the result that any hairs bearing on the skin will be raised and caught in slits 2 upon movement of the razor. We have found that this combination of radial slits and a central cavity gives greatly improved results. More particularly, not only is there better cutting of hairs but this improved cutting can be effected very rapidly.

In Figure 3 the path of the cutting edges of the cutter is indicated by dotted lines 10 and 11, and the construction of the cutter will be described in more detail by reference to Figures 5 and 6. As shown in Figures 5 and 6 the cutter 12 has a plate-shaped supporting portion containing the holes 37 and 38, and three projecting arms 13 having upwardly-extending portions whose end surfaces 14 are provided with cutting edges 15. As shown in Figures 1 and 2, the cutter 12 is so arranged that cavity 4 of the shear plate 1 lies centrally between the arms 13 and the cutting edges 15 travel over the path indicated by reference numerals 10 and 11 in Figure 3. As indicated in Figure 5 the edge 15 of each cutting surface 14 makes a small angle, α, for instance about 7°, with the radial line 16 which extends in substantially the direction of the slits 2 of the shear plate (see Fig. 3) so that the cutting edges will never collide with the edges of the slits and be damaged. If desired the surfaces 14 may slope slightly from the edge 15.

In the embodiment illustrated, the actual cutting is effected only at the flat annular surface indicated by reference numerals 10 and 11 in Figure 3. However, if desired the cutting may be effected at the wall of the cavity 4 and/or at the inner surface of the wall 8 by using a cutter of proper shape.

Although we have described our invention in connection with a specific embodiment and, certain details of constructions, we do not wish to be limited thereto because obvious modifications will present themselves to one skilled in this art.

What we claim is:

1. In a hair-cutting device comprising a shear-plate provided with a central cavity, the annular portion of the plate surrounding said cavity being provided with a plurality of slits distributed around the annular portion and all extending substantially radially, said slits extending through the side wall of said central cavity, and a rotatable cutter having a supporting portion and arm portions each having a cutting edge adapted to engage the edges formed by said slits, the cutting edge of each arm being at an acute angle with the edge of each slit during engagement therewith.

2. In a dry-shaving device, a shear plate having a central recessed portion and an annular portion surrounding said central portion, said annular portion being provided with a plurality of slits distributed around the annular portion and all extending substantially radially, said slits extending through the side wall of said central recessed portion, and a rotatable cutter cooperating with said plate, said slits being widened at the side wall of said central portion to guide hairs into the slits.

3. In a dry-shaving device, a shear plate having a central recessed portion and an annular portion surrounding said central portion and comprising an outer side wall portion, said annular portion being provided with a plurality of slits distributed around the annular portion and all extending substantially radially, and a rotatable cutter cooperating with said plate, said slits extending through the side wall of said central recessed portion and the side wall of said annular portion and being widened at the said side wall portions to guide hairs into the slits.

ALEXANDRE HOROWITZ.
ALEXIS van DAM.